United States Patent
Rau et al.

(10) Patent No.: US 8,781,904 B2
(45) Date of Patent: Jul. 15, 2014

(54) SYSTEM AND METHOD FOR TRANSPONDER-ENABLED ACCOUNT TRANSACTIONS

(75) Inventors: Scott W. Rau, Pottstown, PA (US); Scott Philip Bertetti, Wilmington, DE (US); Gerald A. Beechum, Jr., Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 790 days.

(21) Appl. No.: 12/417,965

(22) Filed: Apr. 3, 2009

(65) Prior Publication Data

US 2009/0192906 A1    Jul. 30, 2009

Related U.S. Application Data

(60) Continuation of application No. 10/143,581, filed on May 10, 2002, now Pat. No. 7,702,538, which is a division of application No. 09/630,595, filed on Aug. 1, 2000, now abandoned.

(51) Int. Cl.
*G06Q 20/00* (2012.01)

(52) U.S. Cl.
USPC ............. 705/16; 705/66; 705/64; 705/17

(58) Field of Classification Search
USPC ........................... 705/66, 64, 16, 17
See application file for complete search history.

(56) References Cited

U.S. PATENT DOCUMENTS

| | | |
|---|---|---|
| 3,438,489 A | 4/1969 | Cambornac et al. |
| 3,468,046 A | 9/1969 | Makishima |
| 3,532,543 A | 10/1970 | Nole |
| 3,537,145 A | 11/1970 | Gerds |
| 3,546,022 A | 12/1970 | Busch et al. |
| 3,806,369 A | 4/1974 | Dey et al. |
| 3,938,090 A | 2/1976 | Borison et al. |
| 4,058,839 A | 11/1977 | Darjany |
| 4,453,074 A | 6/1984 | Weinstein |

(Continued)

FOREIGN PATENT DOCUMENTS

| | | |
|---|---|---|
| DE | 4239562 A1 | 6/1993 |
| DE | 4308193 A1 | 9/1994 |

(Continued)

OTHER PUBLICATIONS

Epper, A Player Goes After Big Bucks in Cyberspace, American Banker, vol. 160, No. 86, ISSN 0002-7561, May 5, 1995, p. 17.

(Continued)

*Primary Examiner* — Seye Iwarere
(74) *Attorney, Agent, or Firm* — Hunton & Williams LLP (57) ABSTRACT

A transponder-initiated transaction system is electromagnetically coupled to an account transponder device at the point of sale. The account transponder device may be embedded within a watch, key chain or other personal article for convenience or affinity. The transponder device may communicate account information to an RF-enabled point of sale device, enabling transactions to take place without resort to remote data processing facilities. In other embodiments partial or complete account information may be accessed or stored at co-located or remote sources. New account registrants may access a Web site to enter a transponder ID and activate a new account, which may be a credit account, debit account, cash account, special purpose vending account, or other types of accounts.

12 Claims, 4 Drawing Sheets

(56) References Cited

U.S. PATENT DOCUMENTS

| | | |
|---|---|---|
| 4,454,414 A | 6/1984 | Benton |
| 4,473,825 A | 9/1984 | Walton |
| 4,523,297 A | 6/1985 | Ugon et al. |
| 4,544,834 A | 10/1985 | Newport et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,650,981 A | 3/1987 | Foletta |
| 4,654,658 A | 3/1987 | Walton |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,722,054 A | 1/1988 | Yorozu et al. |
| 4,746,787 A | 5/1988 | Okada |
| 4,747,620 A | 5/1988 | Kay et al. |
| 4,750,036 A | 6/1988 | Martinez |
| 4,752,676 A | 6/1988 | Leonard et al. |
| 4,754,418 A | 6/1988 | Hara |
| 4,766,293 A | 8/1988 | Boston |
| 4,817,949 A | 4/1989 | Bachman et al. |
| 4,825,052 A | 4/1989 | Ugon |
| 4,833,048 A | 5/1989 | Dejonghe et al. |
| 4,845,347 A | 7/1989 | McCrindle et al. |
| 4,849,618 A | 7/1989 | Namikawa et al. |
| 4,859,837 A | 8/1989 | Halpern |
| 4,868,376 A | 9/1989 | Lessin et al. |
| 4,876,441 A | 10/1989 | Hara et al. |
| 4,897,533 A | 1/1990 | Lyszczarz |
| 4,899,036 A | 2/1990 | McCrindle et al. |
| 4,916,296 A | 4/1990 | Streck |
| 4,922,111 A | 5/1990 | Kuwano |
| 4,923,288 A | 5/1990 | Allen et al. |
| 4,968,873 A | 11/1990 | Dethloff et al. |
| 4,977,455 A | 12/1990 | Young |
| 4,977,501 A | 12/1990 | Lefevre |
| 4,999,617 A | 3/1991 | Uemura |
| 5,025,139 A | 6/1991 | Halliburton, Jr. |
| 5,025,372 A | 6/1991 | Burton et al. |
| 5,025,373 A | 6/1991 | Keyser, Jr. |
| 5,047,614 A | 9/1991 | Bianco |
| 5,053,774 A | 10/1991 | Schuermann et al. |
| 5,055,662 A | 10/1991 | Hasegawa |
| 5,072,380 A | 12/1991 | Randelman et al. |
| 5,080,748 A | 1/1992 | Bonomi |
| 5,097,115 A | 3/1992 | Ogasawara et al. |
| 5,103,079 A | 4/1992 | Barakai et al. |
| 5,107,100 A | 4/1992 | Shepard et al. |
| 5,122,950 A | 6/1992 | Benton et al. |
| 5,154,731 A | 10/1992 | Winger |
| 5,162,175 A | 11/1992 | Visco et al. |
| 5,168,151 A | 12/1992 | Nara |
| 5,173,589 A | 12/1992 | Diehl |
| 5,175,682 A | 12/1992 | Higashiyama |
| 5,191,193 A | 3/1993 | Le Roux |
| 5,227,614 A | 7/1993 | Danielson |
| 5,233,654 A | 8/1993 | Harvey et al. |
| 5,237,620 A | 8/1993 | Deaton |
| 5,241,161 A | 8/1993 | Zuta |
| 5,247,190 A | 9/1993 | Friend et al. |
| 5,249,044 A | 9/1993 | Von Kohorn |
| 5,252,815 A | 10/1993 | Pernet |
| 5,253,345 A | 10/1993 | Fernandes et al. |
| 5,257,486 A | 11/1993 | Holmwall |
| 5,276,311 A | 1/1994 | Hennige |
| 5,285,278 A | 2/1994 | Holman |
| 5,286,955 A | 2/1994 | Kloss |
| 5,287,181 A | 2/1994 | Holman |
| 5,299,940 A | 4/1994 | Uenaka et al. |
| 5,311,594 A | 5/1994 | Penzias |
| 5,317,137 A | 5/1994 | Wilkins |
| 5,321,240 A | 6/1994 | Takahira |
| 5,328,809 A | 7/1994 | Holmes et al. |
| 5,337,063 A | 8/1994 | Takahira |
| 5,339,239 A | 8/1994 | Manabe et al. |
| 5,340,969 A | 8/1994 | Cox |
| 5,351,187 A | 9/1994 | Hassett |
| 5,352,877 A | 10/1994 | Morley |
| 5,357,563 A | 10/1994 | Hamilton et al. |
| 5,359,183 A | 10/1994 | Skodlar |
| 5,382,784 A | 1/1995 | Eberhardt |
| 5,396,558 A | 3/1995 | Ishiguro et al. |
| 5,396,650 A | 3/1995 | Terauchi |
| 5,399,502 A | 3/1995 | Friend et al. |
| 5,401,827 A | 3/1995 | Holmes et al. |
| 5,412,192 A | 5/1995 | Hoss |
| 5,413,341 A | 5/1995 | Lieberman |
| 5,425,497 A | 6/1995 | Sorensen |
| 5,430,644 A | 7/1995 | Deaton et al. |
| 5,448,471 A | 9/1995 | Deaton et al. |
| 5,449,894 A | 9/1995 | Bruhnke et al. |
| 5,450,479 A | 9/1995 | Alesio |
| 5,451,763 A | 9/1995 | Pickett et al. |
| 5,479,172 A | 12/1995 | Smith et al. |
| 5,479,494 A | 12/1995 | Clitherow |
| 5,481,094 A | 1/1996 | Suda |
| 5,483,444 A | 1/1996 | Heintzeman et al. |
| 5,484,997 A | 1/1996 | Haynes |
| 5,488,571 A | 1/1996 | Jacobs |
| 5,492,370 A | 2/1996 | Chatwin et al. |
| 5,495,981 A | 3/1996 | Warther |
| 5,500,890 A | 3/1996 | Rogge et al. |
| 5,504,321 A | 4/1996 | Sheldon |
| 5,504,664 A | 4/1996 | Ostema |
| 5,506,394 A | 4/1996 | Plesko |
| 5,508,731 A | 4/1996 | Kohorn |
| 5,510,828 A | 4/1996 | Lutterbach |
| 5,511,114 A | 4/1996 | Stimson et al. |
| 5,512,654 A | 4/1996 | Holmes et al. |
| 5,513,102 A | 4/1996 | Auriemma |
| 5,516,598 A | 5/1996 | Visco et al. |
| 5,521,363 A | 5/1996 | Tannenbaum |
| 5,523,179 A | 6/1996 | Chu |
| 5,523,794 A | 6/1996 | Mankovitz |
| 5,530,235 A | 6/1996 | Stefik et al. |
| 5,532,689 A | 7/1996 | Bueno |
| 5,535,147 A | 7/1996 | Jacobs |
| 5,537,314 A | 7/1996 | Kanter |
| 5,541,583 A | 7/1996 | Mandelbaum |
| 5,544,246 A | 8/1996 | Mandelbaum et al. |
| 5,550,734 A | 8/1996 | Tater |
| 5,559,313 A | 9/1996 | Claus et al. |
| 5,563,948 A | 10/1996 | Diehl |
| 5,566,441 A | 10/1996 | Marsh |
| 5,568,441 A | 10/1996 | Sanemitsu |
| 5,569,898 A | 10/1996 | Fisher et al. |
| 5,572,004 A | 11/1996 | Raimann |
| 5,577,109 A | 11/1996 | Stimson et al. |
| 5,578,808 A | 11/1996 | Taylor |
| 5,582,623 A | 12/1996 | Chu |
| 5,585,787 A | 12/1996 | Wallerstein |
| 5,590,038 A | 12/1996 | Pitroda |
| 5,592,611 A | 1/1997 | Midgely et al. |
| 5,594,493 A | 1/1997 | Nemirofsky |
| 5,602,919 A | 2/1997 | Hurta et al. |
| 5,604,542 A | 2/1997 | Dedrick |
| 5,613,095 A | 3/1997 | Moss et al. |
| 5,617,474 A | 4/1997 | Ditzig et al. |
| 5,619,558 A | 4/1997 | Jheeta |
| 5,621,787 A | 4/1997 | McKoy et al. |
| 5,621,812 A | 4/1997 | Deaton et al. |
| 5,629,977 A | 5/1997 | Fonseca |
| 5,638,457 A | 6/1997 | Deaton et al. |
| 5,640,002 A | 6/1997 | Ruppert et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,652,602 A | 7/1997 | Fishman |
| 5,652,786 A | 7/1997 | Rogers |
| 5,659,469 A | 8/1997 | Deaton et al. |

(56) References Cited

U.S. PATENT DOCUMENTS

| | | |
|---|---|---|
| 5,663,766 A | 9/1997 | Sizer, II |
| 5,664,110 A | 9/1997 | Green et al. |
| 5,664,157 A | 9/1997 | Takahira et al. |
| 5,672,678 A | 9/1997 | Holmes et al. |
| 5,677,521 A | 10/1997 | Garrou |
| 5,680,459 A | 10/1997 | Hook et al. |
| 5,687,322 A | 11/1997 | Deaton et al. |
| 5,689,100 A | 11/1997 | Carrithers et al. |
| 5,690,412 A | 11/1997 | Sheldon |
| 5,696,824 A | 12/1997 | Walsh |
| 5,698,837 A | 12/1997 | Furuta |
| 5,703,755 A | 12/1997 | Flesher et al. |
| 5,704,044 A | 12/1997 | Tarter et al. |
| 5,706,442 A | 1/1998 | Anderson et al. |
| 5,710,458 A | 1/1998 | Iwasaki |
| 5,715,298 A | 2/1998 | Rogers |
| 5,721,781 A | 2/1998 | Deo et al. |
| 5,727,153 A | 3/1998 | Powell |
| 5,728,998 A | 3/1998 | Novis et al. |
| 5,734,154 A | 3/1998 | Jachimowicz et al. |
| 5,734,838 A | 3/1998 | Robinson et al. |
| 5,736,727 A | 4/1998 | Nakata |
| 5,736,728 A | 4/1998 | Matsubara |
| 5,744,789 A | 4/1998 | Kashi |
| 5,747,784 A | 5/1998 | Walker et al. |
| 5,751,953 A | 5/1998 | Sheils |
| 5,760,381 A | 6/1998 | Stich et al. |
| 5,761,624 A | 6/1998 | Mooney |
| 5,763,862 A | 6/1998 | Jachimowicz |
| 5,763,867 A | 6/1998 | Main et al. |
| 5,767,896 A | 6/1998 | Nemirofsky |
| 5,770,843 A | 6/1998 | Rose et al. |
| 5,770,849 A | 6/1998 | Novis et al. |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,789,732 A | 8/1998 | McMahon et al. |
| 5,789,733 A | 8/1998 | Jachimowicz et al. |
| 5,793,502 A | 8/1998 | Bianco et al. |
| 5,796,827 A | 8/1998 | Coppersmith et al. |
| 5,804,806 A | 9/1998 | Haddad |
| 5,806,044 A | 9/1998 | Powell |
| 5,806,045 A | 9/1998 | Biorge |
| 5,807,627 A | 9/1998 | Friend et al. |
| 5,815,127 A | 9/1998 | Jacobs |
| 5,815,658 A | 9/1998 | Kuriyama |
| 5,817,207 A | 10/1998 | Leighton |
| 5,819,234 A | 10/1998 | Slavin et al. |
| 5,825,884 A | 10/1998 | Zdepski et al. |
| 5,828,044 A | 10/1998 | Jun et al. |
| 5,832,090 A | 11/1998 | Raspotnik |
| 5,832,457 A | 11/1998 | O'Brien |
| 5,844,230 A | 12/1998 | Lalonde |
| 5,845,256 A | 12/1998 | Pescitelli et al. |
| 5,853,498 A | 12/1998 | Beneking et al. |
| 5,854,595 A | 12/1998 | Williams |
| 5,857,079 A | 1/1999 | Claus et al. |
| 5,857,709 A | 1/1999 | Chock |
| 5,859,419 A | 1/1999 | Wynn |
| 5,859,779 A | 1/1999 | Giordano et al. |
| 5,870,155 A | 2/1999 | Erlin |
| 5,870,456 A | 2/1999 | Rogers |
| 5,877,941 A | 3/1999 | Ryu |
| 5,878,141 A | 3/1999 | Daly et al. |
| 5,880,452 A | 3/1999 | Plesko |
| 5,880,769 A | 3/1999 | Nemirofsky |
| 5,882,812 A | 3/1999 | Visco et al. |
| 5,884,271 A | 3/1999 | Pitroda |
| 5,887,271 A | 3/1999 | Powell |
| 5,889,268 A | 3/1999 | Swartz |
| 5,890,135 A | 3/1999 | Powell |
| 5,907,142 A | 5/1999 | Kelsey |
| 5,920,177 A | 7/1999 | Davis |
| 5,920,844 A | 7/1999 | Hotta et al. |
| 5,921,263 A | 7/1999 | Negley |
| 5,923,735 A | 7/1999 | Swartz et al. |
| 5,928,082 A | 7/1999 | Clapper, Jr. |
| 5,928,336 A | 7/1999 | Takeuchi |
| 5,928,439 A | 7/1999 | Ota et al. |
| 5,930,217 A | 7/1999 | Kayanuma |
| 5,932,994 A | 8/1999 | Jo et al. |
| 5,949,044 A | 9/1999 | Walker et al. |
| 5,952,639 A | 9/1999 | Ohki |
| 5,952,641 A | 9/1999 | Korshun |
| 5,952,642 A | 9/1999 | Lutz |
| 5,955,961 A | 9/1999 | Wallerstein |
| RE36,356 E | 10/1999 | Gloton et al. |
| 5,962,837 A | 10/1999 | Main et al. |
| 5,967,264 A | 10/1999 | Lutz |
| 5,970,480 A | 10/1999 | Kalina |
| 5,979,757 A | 11/1999 | Tracy et al. |
| 5,988,503 A | 11/1999 | Kuo |
| 5,991,736 A | 11/1999 | Ferguson et al. |
| 5,995,372 A | 11/1999 | Asakura |
| 6,002,383 A | 12/1999 | Shimada |
| 6,003,008 A | 12/1999 | Postrel et al. |
| 6,003,770 A | 12/1999 | Schilling |
| 6,004,681 A | 12/1999 | Epstein et al. |
| 6,005,183 A | 12/1999 | Akai et al. |
| 6,006,205 A | 12/1999 | Loeb et al. |
| 6,006,775 A | 12/1999 | Negley |
| 6,009,415 A | 12/1999 | Shurling et al. |
| 6,011,858 A | 1/2000 | Stock et al. |
| 6,014,133 A | 1/2000 | Yamakado et al. |
| 6,014,636 A | 1/2000 | Reeder |
| 6,016,298 A | 1/2000 | Fischer |
| 6,016,954 A | 1/2000 | Abe et al. |
| 6,018,718 A | 1/2000 | Walker et al. |
| 6,019,284 A | 2/2000 | Freeman et al. |
| 6,025,283 A | 2/2000 | Roberts |
| 6,027,028 A | 2/2000 | Pieterse et al. |
| 6,030,720 A | 2/2000 | Chu et al. |
| 6,032,136 A | 2/2000 | Brake, Jr. et al. |
| 6,036,099 A | 3/2000 | Leighton |
| 6,041,965 A | 3/2000 | Smith |
| 6,045,042 A | 4/2000 | Ohno |
| 6,048,271 A | 4/2000 | Barcelou |
| 6,049,463 A | 4/2000 | O'Malley et al. |
| 6,056,199 A | 5/2000 | Wiklof et al. |
| 6,064,988 A | 5/2000 | Thomas |
| 6,070,147 A | 5/2000 | Harms et al. |
| 6,073,840 A | 6/2000 | Marion |
| 6,081,792 A | 6/2000 | Cucinotta et al. |
| 6,087,954 A | 7/2000 | McSpadden et al. |
| 6,089,284 A | 7/2000 | Kaehler et al. |
| 6,089,456 A | 7/2000 | Walsh et al. |
| 6,091,817 A | 7/2000 | Bertina et al. |
| 6,092,057 A | 7/2000 | Zimmermann et al. |
| 6,092,669 A | 7/2000 | Kushiya et al. |
| 6,095,072 A | 8/2000 | Kaufhold |
| 6,095,412 A | 8/2000 | Bertina et al. |
| 6,101,477 A | 8/2000 | Hohle et al. |
| 6,105,866 A | 8/2000 | Morrison et al. |
| 6,107,562 A | 8/2000 | Hashimoto et al. |
| D431,039 S | 9/2000 | Wilson et al. |
| D431,252 S | 9/2000 | Wilson |
| 6,116,505 A | 9/2000 | Withrow |
| 6,121,069 A | 9/2000 | Boyko et al. |
| 6,124,545 A | 9/2000 | Bauer et al. |
| D431,573 S | 10/2000 | Wilson |
| D432,141 S | 10/2000 | Wilson |
| D432,548 S | 10/2000 | Wilson |
| D432,552 S | 10/2000 | Wilson |
| D433,031 S | 10/2000 | Wilson |
| D433,032 S | 10/2000 | Wilson |
| D433,033 S | 10/2000 | Wilson |
| D433,034 S | 10/2000 | Wilson |
| D433,035 S | 10/2000 | Wilson |
| D433,036 S | 10/2000 | Wilson |
| D433,037 S | 10/2000 | Wilson |
| D433,059 S | 10/2000 | Okumura et al. |
| 6,128,599 A | 10/2000 | Walker et al. |
| 6,130,623 A | 10/2000 | MacLellan et al. |

(56) References Cited

U.S. PATENT DOCUMENTS

| | | | |
|---|---|---|---|
| D433,420 S | 11/2000 | Wilson | |
| D433,421 S | 11/2000 | Wilson | |
| D433,422 S | 11/2000 | Wilson | |
| D433,423 S | 11/2000 | Wilson | |
| D433,424 S | 11/2000 | Wilson | |
| D434,041 S | 11/2000 | Burke | |
| 6,144,848 A | 11/2000 | Walsh et al. | |
| 6,146,741 A | 11/2000 | Ogawa et al. | |
| 6,156,967 A | 12/2000 | Ralph et al. | |
| 6,156,968 A | 12/2000 | Nishimoto et al. | |
| 6,164,548 A | 12/2000 | Curiel | |
| 6,170,745 B1 | 1/2001 | Schilling | |
| D437,882 S | 2/2001 | Creighton | |
| 6,188,309 B1 | 2/2001 | Levine | |
| 6,189,787 B1 | 2/2001 | Dorf | |
| 6,193,156 B1 | 2/2001 | Han et al. | |
| 6,195,644 B1 | 2/2001 | Bowie | |
| 6,206,292 B1 | 3/2001 | Robertz | |
| 6,213,395 B1 | 4/2001 | Dejaeger et al. | |
| 6,214,155 B1 | 4/2001 | Leighton | |
| 6,219,692 B1 | 4/2001 | Stiles | |
| 6,222,914 B1 | 4/2001 | McMullin | |
| 6,230,970 B1 | 5/2001 | Walsh et al. | |
| 6,243,688 B1 | 6/2001 | Kalina | |
| 6,250,555 B1 | 6/2001 | Inamoto | |
| 6,260,024 B1 | 7/2001 | Shkedy | |
| 6,264,106 B1 | 7/2001 | Bridgelall | |
| 6,267,292 B1 | 7/2001 | Walker et al. | |
| 6,275,681 B1 | 8/2001 | Vega et al. | |
| 6,292,786 B1 | 9/2001 | Deaton et al. | |
| 6,294,241 B1 | 9/2001 | Kaule et al. | |
| 6,298,373 B1 | 10/2001 | Burns et al. | |
| 6,305,607 B1 | 10/2001 | Katz et al. | |
| 6,308,887 B1 | 10/2001 | Korman et al. | |
| 6,315,195 B1 | 11/2001 | Ramachandran | |
| 6,317,721 B1 * | 11/2001 | Hurta et al. | 705/13 |
| 6,318,536 B1 | 11/2001 | Korman | |
| 6,318,636 B1 | 11/2001 | Reynolds et al. | |
| 6,324,524 B1 | 11/2001 | Lent et al. | |
| 6,327,573 B1 | 12/2001 | Walker et al. | |
| 6,327,575 B1 | 12/2001 | Katz | |
| 6,328,342 B1 | 12/2001 | Belousov et al. | |
| 6,329,920 B1 | 12/2001 | Morrison et al. | |
| 6,330,543 B1 | 12/2001 | Kepecs | |
| 6,332,133 B1 | 12/2001 | Takayama | |
| 6,334,216 B1 | 12/2001 | Barth | |
| 6,337,752 B1 | 1/2002 | Heckenkamp et al. | |
| 6,349,972 B1 | 2/2002 | Geiger et al. | |
| 6,354,498 B1 | 3/2002 | Lutz | |
| 6,360,138 B1 | 3/2002 | Coppola et al. | |
| 6,363,355 B1 | 3/2002 | Morrison et al. | |
| 6,366,220 B1 | 4/2002 | Elliott | |
| 6,370,580 B2 | 4/2002 | Kriegsman | |
| 6,371,375 B1 | 4/2002 | Ackley et al. | |
| 6,382,506 B1 | 5/2002 | Van Der Valk | |
| 6,405,181 B2 | 6/2002 | Lent et al. | |
| 6,409,593 B1 | 6/2002 | Petrecca | |
| 6,415,978 B1 | 7/2002 | McAllister | |
| 6,424,884 B1 * | 7/2002 | Brooke et al. | 700/232 |
| 6,424,949 B1 | 7/2002 | Deaton et al. | |
| 6,427,911 B1 | 8/2002 | Barnes et al. | |
| 6,441,736 B1 | 8/2002 | Leighton | |
| 6,454,647 B1 | 9/2002 | Woodbury, Jr. | |
| 6,456,981 B1 | 9/2002 | Dejaeger et al. | |
| 6,470,233 B1 | 10/2002 | Johnson, Jr. | |
| 6,471,128 B1 | 10/2002 | Corcoran et al. | |
| 6,482,330 B1 | 11/2002 | Bajorek | |
| 6,492,717 B1 | 12/2002 | Gore et al. | |
| 6,494,367 B1 | 12/2002 | Zacharias | |
| 6,514,367 B1 | 2/2003 | Leighton | |
| 6,529,880 B1 | 3/2003 | McKeen et al. | |
| 6,533,180 B1 | 3/2003 | Wood | |
| 6,549,912 B1 | 4/2003 | Chen | |
| 6,557,766 B1 | 5/2003 | Leighton | |
| 6,560,581 B1 | 5/2003 | Fox et al. | |
| 6,567,791 B2 | 5/2003 | Lent et al. | |
| 6,607,127 B2 | 8/2003 | Wong | |
| 6,608,551 B1 | 8/2003 | Anderson et al. | |
| 6,609,658 B1 | 8/2003 | Sehr | |
| 6,611,673 B1 | 8/2003 | Bayley | |
| D481,068 S | 10/2003 | Blossom et al. | |
| 6,631,849 B2 | 10/2003 | Blossom | |
| 6,640,214 B1 | 10/2003 | Nambudiri et al. | |
| 6,641,050 B2 | 11/2003 | Kelley et al. | |
| 6,644,551 B2 | 11/2003 | Clayman et al. | |
| 6,672,512 B2 | 1/2004 | Bridgelall | |
| 6,687,714 B1 | 2/2004 | Kogen et al. | |
| 6,702,181 B2 | 3/2004 | Ramachandran | |
| 6,715,797 B2 | 4/2004 | Curiel | |
| 6,725,303 B1 | 4/2004 | Hoguta et al. | |
| 6,734,887 B2 | 5/2004 | Field | |
| D490,840 S | 6/2004 | Arakaki et al. | |
| D491,186 S | 6/2004 | Arakaki et al. | |
| D491,953 S | 6/2004 | Arakaki et al. | |
| 6,749,122 B1 | 6/2004 | Koenck et al. | |
| 6,749,123 B2 | 6/2004 | Lasch et al. | |
| 6,761,316 B2 | 7/2004 | Bridgelall et al. | |
| 6,764,014 B2 | 7/2004 | Lasch et al. | |
| D496,365 S | 9/2004 | Liu et al. | |
| 6,796,490 B1 | 9/2004 | Drummond et al. | |
| 6,809,952 B2 | 10/2004 | Masui | |
| 6,810,304 B1 | 10/2004 | Dickson | |
| D498,236 S | 11/2004 | Liu et al. | |
| 6,811,088 B2 | 11/2004 | Lanzaro et al. | |
| 6,811,862 B2 | 11/2004 | Yoshihara et al. | |
| 6,830,181 B1 | 12/2004 | Bennett | |
| 6,857,566 B2 | 2/2005 | Wankmueller | |
| 6,865,547 B1 | 3/2005 | Brake, Jr. et al. | |
| 6,895,391 B1 | 5/2005 | Kausik | |
| 6,925,439 B1 * | 8/2005 | Pitroda | 705/1.1 |
| 6,942,569 B2 | 9/2005 | Petrecca | |
| 6,945,453 B1 | 9/2005 | Schwarz Jr. | |
| 6,957,334 B1 | 10/2005 | Goldstein | |
| 6,961,710 B1 | 11/2005 | Yanagisawa et al. | |
| 6,965,868 B1 | 11/2005 | Bednarek | |
| 6,970,583 B2 * | 11/2005 | Black | 382/124 |
| 6,970,830 B1 | 11/2005 | Samra et al. | |
| 6,991,157 B2 | 1/2006 | Bishop et al. | |
| 6,998,397 B2 | 2/2006 | Khripach et al. | |
| 7,005,985 B1 | 2/2006 | Steeves | |
| 7,014,110 B2 | 3/2006 | Minowa et al. | |
| 7,025,256 B1 | 4/2006 | Drummond et al. | |
| 7,039,600 B1 | 5/2006 | Meek et al. | |
| 7,040,533 B1 | 5/2006 | Ramachandran | |
| 7,051,925 B2 | 5/2006 | Schwarz, Jr. | |
| 7,059,531 B2 | 6/2006 | Beenau et al. | |
| 7,070,112 B2 | 7/2006 | Beenau et al. | |
| 7,086,584 B2 * | 8/2006 | Stoutenburg et al. | 235/379 |
| 7,089,208 B1 | 8/2006 | Levchin et al. | |
| 7,090,138 B2 | 8/2006 | Rettenmyer et al. | |
| 7,093,767 B2 | 8/2006 | Faenza et al. | |
| 7,096,003 B2 | 8/2006 | Joao et al. | |
| 7,106,843 B1 * | 9/2006 | Gainsboro et al. | 379/191 |
| 7,119,659 B2 | 10/2006 | Bonalle et al. | |
| 7,121,471 B2 | 10/2006 | Beenau et al. | |
| 7,131,574 B1 | 11/2006 | Sciupac et al. | |
| 7,150,393 B1 | 12/2006 | Drummond et al. | |
| 7,154,375 B2 | 12/2006 | Beenau et al. | |
| 7,156,301 B1 | 1/2007 | Bonalle et al. | |
| 7,228,155 B2 | 6/2007 | Saunders | |
| 7,249,097 B2 | 7/2007 | Hutchison et al. | |
| 7,249,099 B2 | 7/2007 | Ling | |
| 7,249,112 B2 | 7/2007 | Berardi et al. | |
| 7,306,141 B1 | 12/2007 | Schwarz, Jr. | |
| 7,308,426 B1 | 12/2007 | Pitroda et al. | |
| 7,311,244 B1 | 12/2007 | Schwarz, Jr. | |
| 7,312,707 B1 | 12/2007 | Bishop et al. | |
| 7,328,189 B2 | 2/2008 | Ling | |
| 7,333,948 B2 | 2/2008 | Bell et al. | |
| 7,340,439 B2 * | 3/2008 | Burger et al. | 705/65 |
| 7,349,866 B2 | 3/2008 | Schwarz, Jr. | |
| 7,376,583 B1 * | 5/2008 | Rolf | 705/17 |
| 7,493,288 B2 | 2/2009 | Biship et al. | |
| 7,526,449 B1 | 4/2009 | Blossom | |

(56) References Cited

U.S. PATENT DOCUMENTS

| | | |
|---|---|---|
| 7,543,156 B2 | 6/2009 | Campisi |
| 7,545,960 B2 | 6/2009 | Coutts |
| 7,571,142 B1 | 8/2009 | Flitcroft et al. |
| 7,580,857 B2 | 8/2009 | VanFleet et al. |
| 7,593,875 B2 | 9/2009 | Granite et al. |
| D602,986 S | 10/2009 | Skelding et al. |
| 7,600,675 B2 | 10/2009 | Petralia et al. |
| 7,630,935 B2 | 12/2009 | Loeger et al. |
| 7,729,925 B2 | 6/2010 | Maritzen et al. |
| 7,729,980 B2 | 6/2010 | Mittenzwei et al. |
| 7,778,876 B2 * | 8/2010 | Gravelle et al. ............... 705/17 |
| 7,801,799 B1 | 9/2010 | Brake et al. |
| 2001/0011247 A1 | 8/2001 | O'Flaherty et al. |
| 2001/0011250 A1 | 8/2001 | Paltenghe et al. |
| 2001/0027441 A1 | 10/2001 | Wankmueller |
| 2001/0034663 A1 | 10/2001 | Teveler et al. |
| 2001/0038033 A1 | 11/2001 | Habib |
| 2001/0039533 A1 | 11/2001 | Pare et al. |
| 2001/0047342 A1 | 11/2001 | Cuervo |
| 2001/0054003 A1 | 12/2001 | Chien et al. |
| 2001/0055411 A1 * | 12/2001 | Black ............................ 382/124 |
| 2002/0007313 A1 | 1/2002 | Mai et al. |
| 2002/0008145 A1 | 1/2002 | Walsh et al. |
| 2002/0022143 A1 | 2/2002 | Ludwig et al. |
| 2002/0030579 A1 | 3/2002 | Albert et al. |
| 2002/0117846 A1 | 8/2002 | Kaule et al. |
| 2002/0133461 A1 | 9/2002 | Ramachandran |
| 2002/0139858 A1 | 10/2002 | Bridgelall et al. |
| 2002/0145039 A1 | 10/2002 | Carroll |
| 2002/0162893 A1 | 11/2002 | Hikita et al. |
| 2002/0167890 A2 | 11/2002 | Duroj |
| 2002/0178063 A1 * | 11/2002 | Gravelle et al. ............... 705/17 |
| 2002/0178369 A1 * | 11/2002 | Black ............................ 713/186 |
| 2003/0005310 A1 | 1/2003 | Shinzaki |
| 2003/0009382 A1 | 1/2003 | Darbeloff et al. |
| 2003/0024995 A1 | 2/2003 | Conner et al. |
| 2003/0040927 A1 | 2/2003 | Sato et al. |
| 2003/0040959 A1 | 2/2003 | Fei et al. |
| 2003/0047253 A1 | 3/2003 | Robinson et al. |
| 2003/0066895 A1 | 4/2003 | Hikita et al. |
| 2003/0075610 A1 | 4/2003 | Ong |
| 2003/0126017 A1 | 7/2003 | Rau et al. |
| 2003/0132301 A1 | 7/2003 | Selker |
| 2003/0167207 A1 | 9/2003 | Berardi et al. |
| 2003/0183689 A1 * | 10/2003 | Swift et al. ................... 235/380 |
| 2003/0187787 A1 | 10/2003 | Freund |
| 2003/0202151 A1 | 10/2003 | Hinata |
| 2003/0213843 A1 | 11/2003 | Jackson |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0220876 A1 * | 11/2003 | Burger et al. ................... 705/50 |
| 2003/0230631 A1 | 12/2003 | Tsunoda et al. |
| 2004/0010449 A1 | 1/2004 | Berardi et al. |
| 2004/0029569 A1 | 2/2004 | Khan et al. |
| 2004/0049451 A1 | 3/2004 | Berardi |
| 2004/0078328 A1 | 4/2004 | Talbert et al. |
| 2004/0094624 A1 | 5/2004 | Fernandes et al. |
| 2004/0117514 A1 | 6/2004 | Nelms et al. |
| 2004/0118930 A1 | 6/2004 | Berardi et al. |
| 2004/0121257 A1 | 6/2004 | Kaminsky et al. |
| 2004/0124248 A1 | 7/2004 | Selker |
| 2004/0133787 A1 | 7/2004 | Doughty et al. |
| 2004/0149544 A1 | 8/2004 | Dal Ferro |
| 2004/0159700 A1 | 8/2004 | Khan et al. |
| 2004/0159708 A1 | 8/2004 | Yogev et al. |
| 2004/0159709 A1 | 8/2004 | Ohta et al. |
| 2004/0169088 A1 | 9/2004 | Nelms et al. |
| 2004/0182936 A1 | 9/2004 | Koenck et al. |
| 2004/0199474 A1 | 10/2004 | Ritter |
| 2004/0210498 A1 | 10/2004 | Freund |
| 2004/0217178 A1 | 11/2004 | Lasch et al. |
| 2004/0230488 A1 | 11/2004 | Beenau et al. |
| 2004/0230536 A1 | 11/2004 | Fung et al. |
| 2004/0232220 A1 | 11/2004 | Beenau et al. |
| 2004/0232221 A1 | 11/2004 | Beenau et al. |
| 2004/0232222 A1 | 11/2004 | Beenau et al. |
| 2004/0232223 A1 | 11/2004 | Beenau et al. |
| 2004/0232224 A1 | 11/2004 | Beenau et al. |
| 2004/0233037 A1 | 11/2004 | Beenau et al. |
| 2004/0233038 A1 | 11/2004 | Beenau et al. |
| 2004/0233039 A1 | 11/2004 | Beenau et al. |
| 2004/0236688 A1 | 11/2004 | Bozeman |
| 2004/0236699 A1 | 11/2004 | Beenau et al. |
| 2004/0236700 A1 | 11/2004 | Beenau et al. |
| 2004/0236701 A1 | 11/2004 | Beenau et al. |
| 2004/0238621 A1 | 12/2004 | Beenau et al. |
| 2004/0239480 A1 | 12/2004 | Beenau et al. |
| 2004/0239481 A1 | 12/2004 | Beenau |
| 2004/0242308 A1 | 12/2004 | Gray |
| 2004/0243468 A1 | 12/2004 | Cohagan et al. |
| 2004/0249710 A1 | 12/2004 | Smith et al. |
| 2004/0249712 A1 | 12/2004 | Brown et al. |
| 2004/0249839 A1 | 12/2004 | Beenau et al. |
| 2004/0252012 A1 | 12/2004 | Beenau et al. |
| 2004/0256469 A1 | 12/2004 | Faenza, Jr. et al. |
| 2004/0257197 A1 | 12/2004 | Beenau et al. |
| 2004/0260646 A1 | 12/2004 | Berardi et al. |
| 2005/0004839 A1 | 1/2005 | Bakker et al. |
| 2005/0004866 A1 | 1/2005 | Bonalle et al. |
| 2005/0006481 A1 | 1/2005 | Han et al. |
| 2005/0012326 A1 | 1/2005 | Keller et al. |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0023359 A1 | 2/2005 | Saunders |
| 2005/0033619 A1 | 2/2005 | Barnes et al. |
| 2005/0033637 A1 | 2/2005 | Underwood |
| 2005/0033686 A1 | 2/2005 | Peart et al. |
| 2005/0033687 A1 | 2/2005 | Beenau |
| 2005/0033688 A1 | 2/2005 | Peart et al. |
| 2005/0033689 A1 | 2/2005 | Bonalle et al. |
| 2005/0035847 A1 | 2/2005 | Bonalle et al. |
| 2005/0038718 A1 | 2/2005 | Barnes et al. |
| 2005/0038736 A1 | 2/2005 | Saunders |
| 2005/0038741 A1 | 2/2005 | Bonalle et al. |
| 2005/0040242 A1 | 2/2005 | Beenau et al. |
| 2005/0049965 A1 | 3/2005 | Jen |
| 2005/0050367 A1 * | 3/2005 | Burger et al. ................... 713/202 |
| 2005/0055270 A1 | 3/2005 | Broe |
| 2005/0060233 A1 | 3/2005 | Bonalle et al. |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071231 A1 | 3/2005 | Beenau et al. |
| 2005/0075889 A1 | 4/2005 | Gomes et al. |
| 2005/0077349 A1 | 4/2005 | Bonalle et al. |
| 2005/0080672 A1 | 4/2005 | Courtion et al. |
| 2005/0086103 A1 | 4/2005 | Agura et al. |
| 2005/0091104 A1 | 4/2005 | Abraham |
| 2005/0091138 A1 | 4/2005 | Awatsu |
| 2005/0096976 A1 | 5/2005 | Nelms |
| 2005/0102178 A1 | 5/2005 | Phillips et al. |
| 2005/0108090 A1 | 5/2005 | Takeda et al. |
| 2005/0114883 A1 | 5/2005 | Nagai et al. |
| 2005/0116024 A1 | 6/2005 | Beenau et al. |
| 2005/0116810 A1 | 6/2005 | Beenau et al. |
| 2005/0119938 A1 | 6/2005 | Smith et al. |
| 2005/0122209 A1 * | 6/2005 | Black ............................ 340/5.52 |
| 2005/0125292 A1 | 6/2005 | Kassab et al. |
| 2005/0131761 A1 | 6/2005 | Trika et al. |
| 2005/0131792 A1 | 6/2005 | Rowe |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0149386 A1 | 7/2005 | Agura et al. |
| 2005/0149393 A1 | 7/2005 | Leof |
| 2005/0160003 A1 | 7/2005 | Berardi et al. |
| 2005/0165695 A1 | 7/2005 | Berardi et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171898 A1 | 8/2005 | Bishop et al. |

(56) References Cited

U.S. PATENT DOCUMENTS

| | | | |
|---|---|---|---|
| 2005/0177503 A1 | 8/2005 | Thomas | |
| 2005/0179251 A1 | 8/2005 | Wagoner et al. | |
| 2005/0187820 A1 | 8/2005 | Mohan | |
| 2005/0189427 A1 | 9/2005 | Brown et al. | |
| 2005/0192862 A1 | 9/2005 | Modi | |
| 2005/0194453 A1 | 9/2005 | Connor et al. | |
| 2005/0197904 A1 | 9/2005 | Baron et al. | |
| 2005/0203824 A1 | 9/2005 | Freud et al. | |
| 2005/0205666 A1 | 9/2005 | Ward et al. | |
| 2005/0209917 A1 | 9/2005 | Anderson et al. | |
| 2005/0216346 A1 | 9/2005 | Kusumoto et al. | |
| 2005/0216888 A1 | 9/2005 | Drummond et al. | |
| 2005/0218214 A1* | 10/2005 | Gravelle et al. | 235/380 |
| 2005/0222906 A1 | 10/2005 | Chen | |
| 2005/0234769 A1 | 10/2005 | Jain et al. | |
| 2005/0234773 A1 | 10/2005 | Hirst et al. | |
| 2005/0240474 A1 | 10/2005 | Li | |
| 2005/0240477 A1 | 10/2005 | Friday et al. | |
| 2005/0242179 A1 | 11/2005 | Warwick | |
| 2005/0246289 A1 | 11/2005 | Alexander et al. | |
| 2005/0251446 A1 | 11/2005 | Jiang et al. | |
| 2005/0251470 A1 | 11/2005 | Sullivan | |
| 2005/0256794 A1 | 11/2005 | Colby | |
| 2005/0261972 A1* | 11/2005 | Black | 705/21 |
| 2005/0267800 A1 | 12/2005 | Tietzen et al. | |
| 2005/0273386 A1 | 12/2005 | Weidner | |
| 2005/0273387 A1 | 12/2005 | Previdi | |
| 2005/0278215 A1 | 12/2005 | Seele, Jr. | |
| 2005/0288998 A1 | 12/2005 | Verma et al. | |
| 2005/0289003 A1 | 12/2005 | Thompson et al. | |
| 2006/0004629 A1 | 1/2006 | Neemann et al. | |
| 2006/0010033 A1 | 1/2006 | Thomas | |
| 2006/0010034 A1 | 1/2006 | Sparks | |
| 2006/0011719 A1 | 1/2006 | Lehtonen et al. | |
| 2006/0012473 A1 | 1/2006 | Bishop et al. | |
| 2006/0020507 A1 | 1/2006 | Sagey | |
| 2006/0026073 A1 | 2/2006 | Kenny et al. | |
| 2006/0036553 A1 | 2/2006 | Gupta et al. | |
| 2006/0039733 A1 | 2/2006 | Meyerhofer | |
| 2006/0041540 A1 | 2/2006 | Shannon et al. | |
| 2006/0074698 A1 | 4/2006 | Bishop et al. | |
| 2006/0074813 A1 | 4/2006 | Saunders | |
| 2006/0102729 A1 | 5/2006 | Gandel et al. | |
| 2006/0124753 A1 | 6/2006 | Scholz et al. | |
| 2006/0131408 A1 | 6/2006 | McNamara | |
| 2006/0178937 A1 | 8/2006 | Rau et al. | |
| 2006/0214008 A1 | 9/2006 | Asami et al. | |
| 2006/0219776 A1 | 10/2006 | Finn | |
| 2006/0255155 A1 | 11/2006 | Cranston et al. | |
| 2007/0094084 A1 | 4/2007 | Rau et al. | |
| 2007/0094154 A1 | 4/2007 | Rau et al. | |
| 2007/0129955 A1* | 6/2007 | Dalmia et al. | 705/1 |
| 2007/0131759 A1 | 6/2007 | Cox et al. | |
| 2007/0170264 A1 | 7/2007 | Lasch et al. | |
| 2007/0203825 A1 | 8/2007 | Hanifin et al. | |
| 2007/0228144 A1 | 10/2007 | Knackstedt et al. | |
| 2007/0251999 A1 | 11/2007 | Bohlke, III et al. | |
| 2007/0265924 A1 | 11/2007 | Schwarz | |
| 2007/0276929 A1 | 11/2007 | Allen et al. | |
| 2008/0010202 A1 | 1/2008 | Schwarz | |
| 2008/0021841 A1 | 1/2008 | Rau et al. | |
| 2008/0067247 A1 | 3/2008 | McGregor et al. | |
| 2009/0043651 A1 | 2/2009 | Schwarz | |
| 2009/0289106 A1 | 11/2009 | Bishop et al. | |

FOREIGN PATENT DOCUMENTS

| | | |
|---|---|---|
| EP | 0061373 A2 | 9/1982 |
| EP | 0254595 A2 | 1/1988 |
| EP | 0465456 A1 | 8/1992 |
| EP | 0855659 | 7/1998 |
| GB | 2154832 A | 9/1985 |
| GB | 2267626 A | 8/1993 |
| WO | WO 88/03296 | 5/1988 |
| WO | WO 90/14644 | 11/1990 |
| WO | WO 91/14237 | 9/1991 |
| WO | WO 94/22115 | 9/1994 |
| WO | WO 97/24689 | 7/1997 |
| WO | WO 97/45814 | 12/1997 |
| WO | WO 98/37524 | 9/1998 |
| WO | WO 00/49551 | 8/2000 |

OTHER PUBLICATIONS

American Banker, A Glossary of Computer Technology Terms, American Banker Publications, vol. 154, No. 209, Oct. 25, 1989.
Sotto, An RFID Code of Conduct, RFID Journal, Featured Opinions, May 30, 2005.
BSI2000 Files Patent Application for Optical Bank Card Press Release, printed Apr. 27, 2004.
Brehl, Banks issue cash-card pledge, The Toronto Star, Oct. 9, 1997, 1 page.
Card Flash, Daily Payment Card News, www.CardWeb.com, printed Aug. 10, 2004.
Rosen, Cash Just Isn't Flexible Enough Shops of the Future Will Only Take Cards, Daily Express, Technology Section, Feb. 10, 1995, 1 page.
Hesseldahl, China Goes Smartcard Crazy, www.forbes.com, Jun. 12, 2001.
Schwartz, Digital Cash Payoff (2001).
E-Z Pass, E-ZPass Discount Plans . . . You Save Money, Too! Web page at http:\\www.ezpass.com-frameMain.html, Nov. 12, 2001.
E-Z Pass, E-ZPass Enrollment Discount Plans, Web page at http://www.ezpass.com-Disc_ny_annual.html, Nov. 12, 2001.
E-Z Pass, Standard Automatic Discount Programs, Web page at http://www.ezpass.com-Disc_portNewYork.html, Nov. 12, 2001.
E-Z Pass, What is E-Z Pass? Web page at http://www.ezpass.com-whatis,html, Nov. 12, 2001.
Business Times, Electronic Purse Can Free You frown ATM Drag, Business Times, www.btimes,co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computervorld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Frequently asked questions, ECARD, www.eregard.com, printed Sep. 23, 2001, 7 pages.
Machlis, Have it the smart way Burger King program drives smart-card use, Computerworld, printed Feb. 23, 2001, 1 page.
Levin, Leveraging Business Method Patents to Protect Broad Business Interests—A Technology Company Study; 4th Annual Patenting Business Methods in the Financial Services Industry Conference, Jul. 24-25, 2007.
Nokia Announces the World's First NFC Enabled Mobile Product for Contactless Payment and Ticketing, PRNewswire, Feb. 9, 2005.
Proton world and Europay to co-operate in creation of new CEPS-compliant e-purse application, Press Release 1999, Waterloo, Belgium, Jun. 28, 1999, 2 pages.
Purse Application for Cross Border Use in Euro, Cordis, Pace 1st 1999-11531 Pace, www.cordis.lu, printed Feb. 23, 2001, 3 pages.
RFID Tags, Contactless Smart Card Technology Comparing and Contrasting Applications and Capabilities, www.smartcardalliance.org, Feb. 17, 2005.
RFID Tags, Contactless Smart Card Technology and Electronic Passports Frequently Asked Questions, www.smartcardalliance.org, Feb. 17, 2005.
SK100 Smart Card Electronic Purse Balance Reader, SK100 Balance Reader, http//perso.wanadoo.fr, printed Feb. 23, 2001, 1 page.
Rankl et al., Smart Card Handbook (1999).
Rankl et al, Smart Card Handbook Second Edition (1999).
Gilhooly, Smart Cards, Smart Move?, Computerworld, May 21, 2001, pp. 1-5.
Smart card for loyalty and c-purse applications eclipses capability of conventional mag-stripe cards, Press Release, www.1.sib.com, Apr. 21, 1997, printed Feb. 23, 2001, 3 pages.

(56) References Cited

OTHER PUBLICATIONS

SmartAxis Load Cash on to your E-Purse Card, Supported Currencies and Schemes, www.smartaxis.co.uk, printed Feb. 23, 2001, 9 pages.

Dvorak, Smartcards Get Smarter, www.forbes.com, Jun. 1, 2001.

Hesseldahl, Stock Focus Smartcard Companies, www.forbes.com, Jun. 18, 2001.

The Electronic Purse Reaches the Car Park, http\\docs.vircom.net/mobility/parking, printed Feb. 23, 2001, 2 pages.

Stuber, The electronic purse An overview of recent development and issues, Bank of Canada, Technical Report No. 74, www.bankofcanada.ca, Jan. 1996, printed Feb. 23, 2001, 2 pages.

Transponders Cash in a Flash, www.forbes.com Jul. 31, 2001.

Hesseldahl, U.S. Getting Wise to Smart Cards, Forbes.com, May 25, 2000.

Understanding the benefits Smartcity offers a number of important benefits to both the card issuers and their customers, http//www.icl.com/smartcards/benefits.htm, printed Feb. 27, 2001, 2 pages.

Visa first to launch electronic purse load via GSM mobile phone, www.cellular.co.za, Johannesburg, ZA, printed Feb. 23, 2001, 4 pages.

Hansell, Visa to unveil electronic purse cards, New York Times, printed Feb. 23, 2001, 2 pages.

Visa, MBNA and De La Rue Launch Multi-Function Smart Card Program, www.findarticles.com, Jul. 6, 1998.

Machlis et al., Will smart cards replace ATMS? Computerworld, printed Feb. 23, 2001, 3 pages.

A Different Drummer on the Data Highway, American Banker, May 12, 1995.

Ron White, How Computers Work, Millennium Edition, Que Corporation, Sep. 1999.

Derfler, Frank J. et al., How Networks Work, Millennium Edition Que Corporation, Jan. 2000.

Horngren, Charles et al., Introduction to Financial Accounting, Revised $3^{rd}$ Edition, Prentice-Hall, Inc. (1998).

Borland's Paradox for Windows User's Guide, Borland International Inc. (1994).

\* cited by examiner

SYSTEM AND METHOD FOR TRANSPONDER-ENABLED ACCOUNT TRANSACTIONS

RELATED APPLICATIONS

This patent application is a continuation of U.S. patent application Ser. No. 10/143,581, filed on May 10, 2002, entitled "System and Method for Transponder Enabled Account Transactions," which is a divisional of U.S. patent application Ser. No. 09/630,595, filed on Aug. 1, 2000, entitled "System and Method for Transponder Enabled Account Transactions." The disclosures of these priority applications are hereby incorporated herein by reference in their entireties.

FIELD OF THE INVENTION

The invention relates to the field of electronic commerce, and more particularly to the use of transponder-activated account transactions at point of sale or other locations.

BACKGROUND OF THE INVENTION

The use of electromagnetically-coupled transducers for commercial transaction processing has become increasingly popular in recent times. The advent of compact, inexpensive electronics, transponder-equipped point of sale equipment, and attendant information processing assets have enabled a variety of vendors to offer account-linked transaction systems. Those systems include, for example, subway or other transportation devices, telephone calling devices, and others such as the SpeedPass™ offered by Mobil Corp. for gasoline point of sale transactions. In that and other systems, a receiver emits electromagnetic signals to a device in proximity to a gasoline pump over radio frequencies (RF), activating an embedded transponder within the transaction device. The transaction device is identified by some sort of identification information, which information is then relayed from the point of sale to an offsite information processing facility. However, these types of distributed systems suffer from more than one disadvantage.

For one, transactions made according to that technology require that separate offsite computing facilities be accessed, since the transponder in encoded with information identifying the transponder but not the account information necessary to complete the transaction. Processing times and time to completion of transactions are therefore increased, and the expense of linking and maintaining information processing facilities to service the point of sale request is significant. Moreover, the initiation of new accounts to use such wireless vending points requires backend processing facilitates to enter a new user's account to the remote data processing facility, as well as to encode and associate the transponder with particular new accounts. More streamlined, convenient and flexible transaction technology is desirable.

SUMMARY OF THE INVENTION

The invention overcoming these and other drawbacks in the art relates to a system and method for transponder-activated transactions, generally involving the presentation and sensing of an electromagnetically coupled transponder to an RF-enabled point of sale system. In the practice of the invention, the transponder may be preferably encoded with not merely identifying or serializing information, but also account information which may be used to authorize or record transactions at the instant of sale, so that remote data processing may not be necessary. Users of the transponder of the invention may link the device to more than one type of account, and activate the transponder using Web or other network-enabled interfaces.

BRIEF DESCRIPTION OF THE DRAWINGS

The invention will described with reference to the accompanying drawings, in which like elements are referenced by like numerals.

DETAILED DESCRIPTION OF PREFERRED EMBODIMENTS

Figure 1:
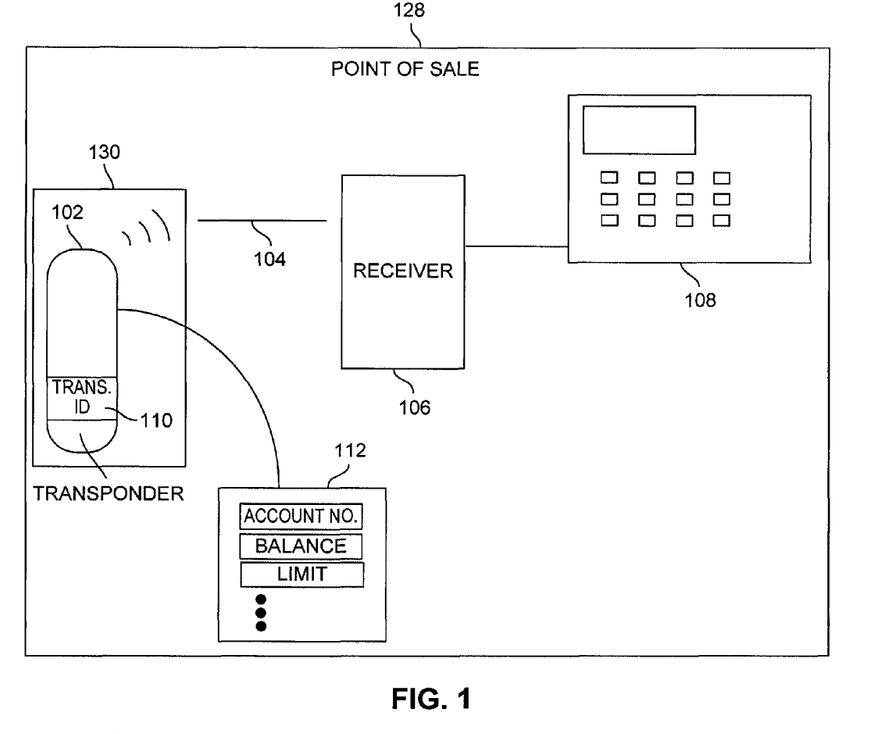
FIG. 1 illustrates an overall transaction architecture according to one embodiment of the invention.

As illustrated in FIG. 1, in a first embodiment of the invention, an overall point of sale architecture includes a transponder 102 which communicates via an RF link 104 to a receiver 106. The transponder 102 may be or include any of several known electromagnetically coupled devices, generally activated by proximity to an RF-enabled receiving unit, such as receiver 106. Transponder 102 may, for instance, contain an electromagnetic coil antenna for inductive coupling to receiver 106, thereby being energized with small but sufficient electric current to activate embedded electronics within transponder 102. Those electronics may include memory such as CMOS memory, logic gates, filters for isolating discrete transmission frequencies and other elements known in the art. In one embodiment, transponder 102 may be programmable and able to receive updated programmable instructions via RF link 104, as well as to have electronic memory erased or updated during transactions. Receiver 106 may include an electromagnetic antenna to couple with transponder 102, generally within the range of a few feet of the device.

In the embodiment illustrated in FIG. 1, the receiver 106 is connected to a point of sale (POS) device 108 for conducting a commercial or other transaction. For instance, the point of sale device 108 may be or include any of several commercially known electronic cash registers or related transaction processing equipment, such as point of sale terminals manufactured by Sharp Corp. or others. In one embodiment of the invention, transponder 102 may be embedded within a personal article for convenience, aesthetic and affinity purposes. In that regard, the invention has been integrated in one implementation within a fully functional watch manufactured by the Swatch Corporation. Embedding in other personal articles, such as key chains, pagers, clothing or other items is also possible.

In the operation of the invention, a user who has subscribed to the account system of the invention may approach the receiver 106 at the point of sale device 108 to initiate and complete a purchase or other transaction, such as at a restaurant or grocery market checkout line, or other points of sale. In the embodiment illustrated in FIG. 1, transponder 102 contains an encoded transponder ID 110, which may for instance be a 5-digit number or other identifying information. In this embodiment, transponder 102 may also store an account table 112 directly recording account information for the subscribed user of the transponder 102. The account table 112 may be or include, for instance, an indication of an account number, balance, limit and other information for a debit account, a cash account, a credit card account, special premises account for internal use such as by employees, or other account information associated with users of the system.

In the implementation of this embodiment of the invention, receiver 106 is configured to receive the account table 112 and apply an amount being executed at the point of sale device 108 to the account reflected within the account table 112. For instance, a patron who has subscribed to an account according to the system of the invention may approach receiver 106 in a restaurant line and wave a watch or other article containing transponder 102 in proximity of the receiver 106. When transponder 102 comes within range of receiver 106, transponder 102 may be inductively coupled to the coils of an electromagnetic antenna within receiver 106 inducing electrical energy within transponder 102, to establish the RF link 104 with the receiver 106. Upon activation of transponder 102 and radiation of transponder ID 110 to the receiver 106, the receiver 106 may respond with an acknowledge signal to the transponder 102. The point of sale device 108 may indicate on a display screen or otherwise that a transaction is ready to be commenced. Once the point of sale device 108 generates total amount due for the transaction, the receiver 106 may interrogate transponder 102 to obtain account table information from account table 112 for application to the sale.

For instance, if a patron has purchased a meal in a restaurant line at point of sale device 108, the total purchase price may be validated against available credit, available cash or other account-specified balances within account table 112 for completion of the transaction. Conversely, if the amount of the transaction cannot be validated against account table 112, the point of sale device 108 may indicate "cash required" or another message that transponder validation or authorization has failed. If the transaction amount is validated, receiver 106 enters the transaction amount, recalculates an account balance for storage within account table 112 and transmits the revised account table 112 information over the RF link 104 to the transponder 102. A transaction completion signal may be emitted by receiver 106, which in one embodiment may turn off or decouple the transponder 102 via RF link 104.

Among other advantages, because the receiver 106 and other transaction elements do not need to resort to offsite transaction processing, conduct of the transaction from initiation through approval and completion are completed quickly, often virtually instantaneously to a subscriber at the point of sale. It may be noted that receiver 106 and point of sale device 108 may be configured to execute a variety of other types of transactions, such as retail checkouts of books, movies of other media, and other transaction events.

Figure 3:
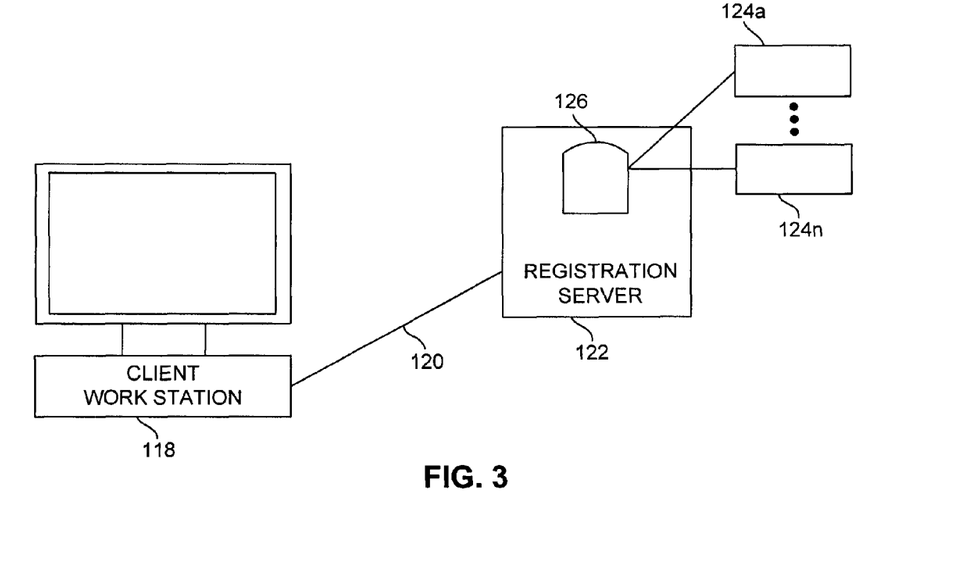
FIG. 3 illustrates an activation architecture for the initiation of user accounts according to the invention.

In terms of new accounts registration as illustrated in FIG. 3, in the invention a network-based activation architecture may be advantageously employed. As shown in the figure, a new user may access a client work station 118 connected via communications link 120 to a registration server 122. The communications link 120 may be, include or access any one or more of, for instance, the Internet, an intranet, a PAN (Personal Area Network), a LAN (Local Area Network), a WAN (Wide Area Network) or a MAN (Metropolitan Area Network), a flame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections.

Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

The registration server 122 may be or include, for instance, a workstation running the Microsoft Windows™ NT™, Windows™ 2000, Unix, Linux, Xenix, IBM ADC, Hewlett-Packard UX, Novell Netware™, sun Microsystems Solaris™, OS/2™, BeOS™, Mach, Apache, OpenStep™ or other opting system or platform.

The registration server 122 may communicate with client workstation 118 to receive preassigned information related to transponder 102, such as transponder ID 110 which may be printed by sticker on a watch or other article housing the device, for entry into a database 126 within registration server 122 and the setting up of an account. The account may illustratively include or be more than one type of account 124a . . . 124n, such as cash accounts, debit accounts, credit card accounts, special purpose vending accounts, telephone card accounts, or others. The registration server 1I) may validate the transponder ID 110, and interrogate 2 new subscriber at client work station 118 to identify or select which one or more of accounts 124a . . . 124n the user wishes to associate with the transponder 102.

For instance, the registration 122 may accept a preexisting credit card $ number for registration with the transponder 102 and execution of fixture transactions. Once new account information is established, the registration server 122 may communicate via network connection to receiver 106 to update subscriber registration tables within the database 126, receiver 106, point of sale device 108 or other associated hardware to authorize transactions at the point of sale. The paperwork, delay, possibility for error and other drawbacks of paper-based back end account registration is thereby avoided.

Figure 2:
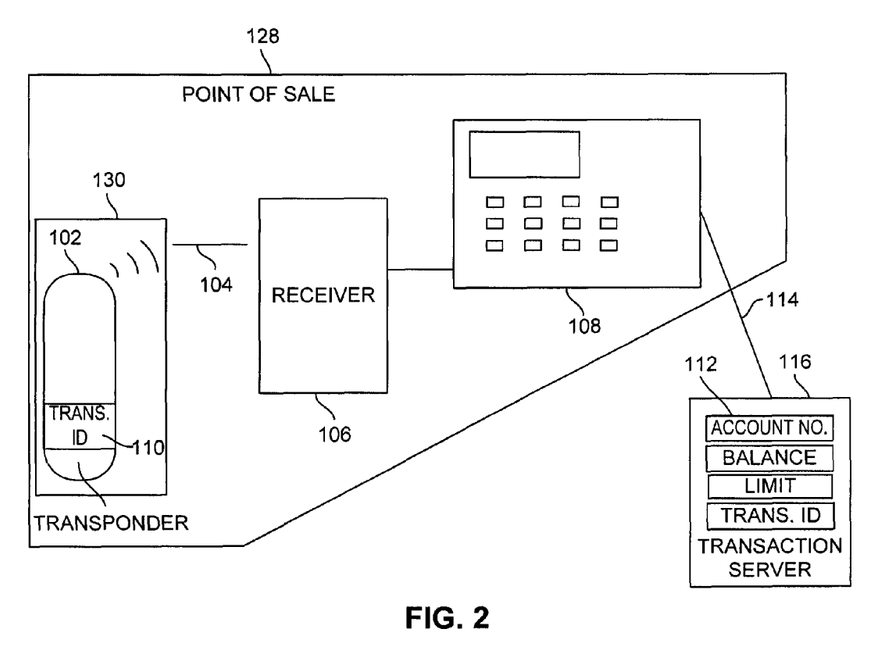
FIG. 2 illustrates an overall architecture of the invention according to a second embodiment of the invention.

A second illustrative embodiment of the invention is shown in FIG. 2, generally involving a processing architecture similar to that of FIG. 1. In this embodiment, a transponder 102 again communicates via RF link 104 with receiver 106 to effectuate point of sale or other transactions. However, in the embodiment of FIG. 2 a portion or all of account table 112 or other information stored in transponder 102 in the first embodiment may be offloaded to economize on the necessary electronics, power consumption and other properties of transponder 102. In the embodiment illustrated in FIG. 2, the point of sale device 108 is additionally connected to a transaction server 116 via communications link 114, for the purpose of authorizing in whole or in part transactions presented for payment using transponder 102. Communications link 114 may be, include or access communications resources similar to communications link 120.

In this embodiment, part or all of the information of account table 112 may be stored in hard disk or other storage of transaction server 116. Transaction initiation begins in the same manner as the embodiment illustrated in FIG. 1, however, after acknowledgments are exchanged between point of sale device 108 and transponder 102 and a transaction is set up, the point of sale device 108 may communicate with transaction server 116 to validate a transaction amount or other information against account information stored in the transaction server 116.

While this implementation involves additional hardware and communications link 114, if transaction server 116 is co-located with the point of sale device 108, such as in a restaurant or retail outlet, communication delays may be minimal. Furthermore if the transaction server 116 is dedicated to processing transactions only at the site of point of sale device 108 or closely grouped facilities, processing burdens may be comparatively modest. In another embodiment of the invention, transaction server 116 may communicate with remote credit file databases or other information resources before authorizing or completing a transaction initiated over RF link 104 at receiver 106, when circumstances may permit some execution delay to be acceptable. Alternatively, in another embodiment of the invention the point of sale device 108 may perform a preliminary authorization for transactions presented at the receiver 106, to collect and temporarily store transactions, for instance over 2 or 3 hour periods, for batch processing remotely via transaction server 116. Since the majority of transactions typically reconcile without difficulty, this implementation permits more-immediate completion while still checking on account validations at frequent intervals.

Figure 4:
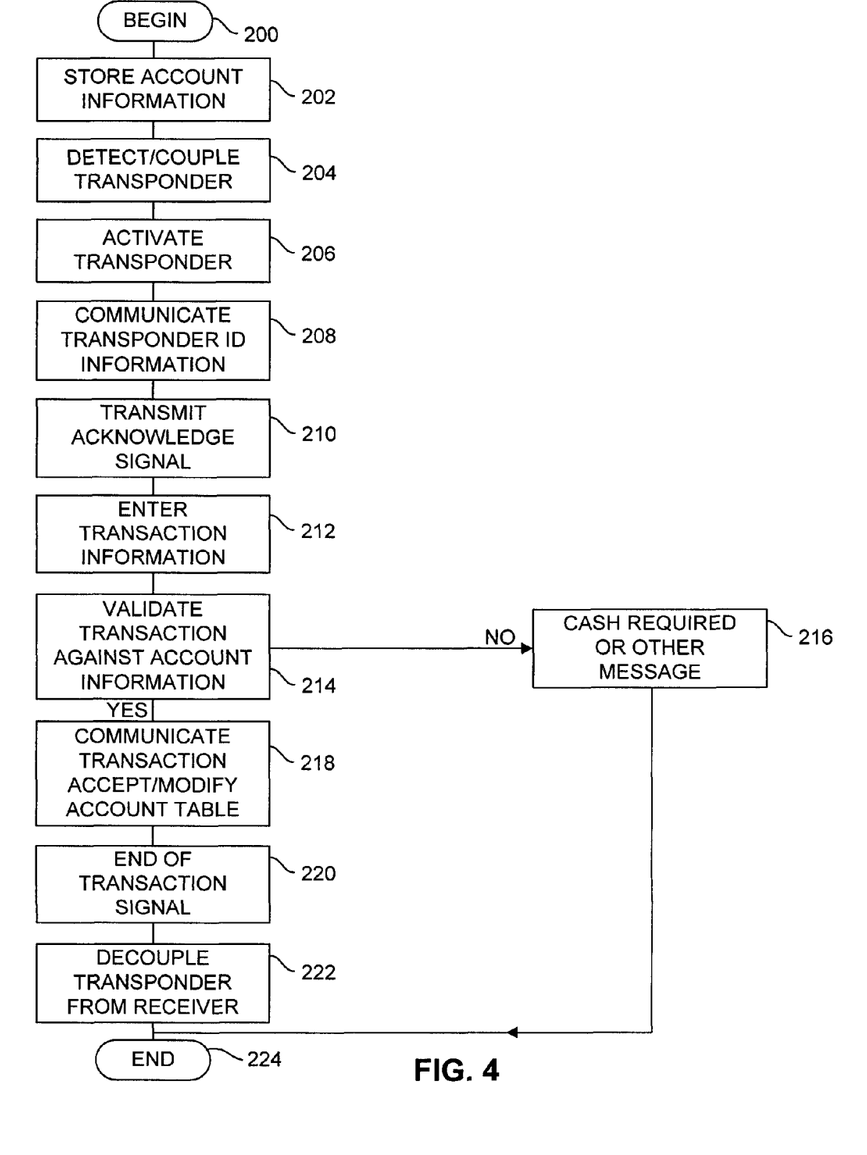
FIG. 4 illustrates a flowchart of transaction processing according to the invention.

Overall transaction processing is illustrated in the flowchart of FIG. 4. In step 202, processing begins. In step 204, the receiver 106 is presented with transponder 102 within range of electromagnetic coupling, such as inductive coupling. In step 206, transponder 102 is activated, for instance by inductive energization of its circuitry. In step 208 transponder 102 may communicate transponder ID 110, which the receiver 106 acknowledges with an acknowledge signal over RF link 104 in step 210.

In step 212, transaction information such as purchase amount is entered at point of sale device 108, for instance by a check out clerk or other attendant. In step 214, transaction table 112 or other account information may be interrogated to determine whether account balances or other account parameters permit the pending transaction at the point of sale device 108. If the transaction is not validated, in step 216 a "cash required" or other message is signaled at point of sale device 108, and processing proceeds to step 224 whole processing ends.

If the account to be applied to the pending transaction is validated at step 214, in step 218, the point of sale device 108 and receiver 106 communicate with transponder 102 to indicate transaction acceptance, and modify information within account table 112 if appropriate. In step 220, an end of transaction signal is sent to transponder 102 and in step 222, transponder 102 decouples from the receiver 106. In step 224, processing ends.

The foregoing description of the system and method for transponder-activated transactions is illustrative, and variations in configuration and implementation will occur to persons skilled in the art. For instance, while transponder 102 has been described as electromagnetically coupling with the receiver 106, or other types of detection and, coupling could be used. For instance, an infrared device, a biometrically enabled or other device may be presented to corresponding detecting apparatus at the point of sale. Similarly, transponder 102 may contain or store other types or forms of information other than transponder ID 110 and account table 112. The scope of the invention is accordingly intended to be limited only by the following claims.

What is claimed:

1. A computer implemented system for authorizing transponder-enabled transactions, comprising:
    a transaction server comprising a memory that stores an account table and is communicatively linked to a point of sale device, wherein the account table comprises financial account information relating to a financial account and the point of sale device is associated with a merchant;
    a transponder, that is provided to a user and is configured for inclusion in or on a wireless communications device that communicates independently of the transponder, that emits transponder identification information, linked to the financial account information, and that is capable of being received by a transponder information identification receiver that is coupled to the point of sale device, and the transponder identification information is emitted from the transponder upon presentation of the transponder with a transaction presented at the point of sale device;
    wherein further the received transponder identification information is communicated to the point of sale device, and subsequently transmitted to the transaction server along with a payment amount for the transaction, the transmission occurring via the communications link, and the transaction server providing a validation for the transaction, allowing the transaction to be completed, based upon the validation;
    wherein the transaction server and the account table are associated with an issuing bank and a transaction network; and
    a registration server communicatively coupled with at least the account table and at least one client workstation;
    wherein the registration server receives the financial account information and the transponder identification information from the client workstation, and links the financial account information and the transponder identification information in a database, and stores the linked information in the database for subsequent processing of transactions.

2. The system of claim 1, wherein the transaction server comprises;
    a payment authorization unit that performs the validation of the transaction based at least in part upon the financial account information in the account table and transmits a message of non-authorization for the transaction to the point of sale device upon failure of the validation of the transaction.

3. The system of claim 2, wherein the transaction server transmits an authorization for the transaction to the point of sale device upon validation of the transaction, the validation being performed using information in the account table by the payment authorization unit.

4. The system of claim 1, further comprising the registration server being coupled to the transponder identification information receiver and updates one or more subscriber registration tables contained within the transponder identification information receiver to allow the transponder to be recognized upon receipt of the transponder identification information.

5. The system of claim 1, further comprising a merchant account to which an authorized payment is made, wherein the merchant account is associated with the merchant and the issuing bank.

6. The system of claim 1, wherein the transponder identification information is received by the transponder identification information receiver from the transponder via a wireless interface.

7. The system of claim 1, wherein the communications link comprises a plurality of communications links between the transaction server and multiple point of sale devices.

8. The system of claim 1, wherein the financial account comprises at least one of:
a credit card account, a debit card account, a cash account, a special premises account for use by employees of an entity, a special purpose vending account, and a telephone card account.

9. The system of claim 1, wherein the transaction identification information receiver transmits an acknowledgement signal over the link established to the transponder upon receiving the transponder identification information.

10. The system of claim 1, wherein the transaction server is co-located in physical proximity with the point of sale device.

11. A computer implemented system for authorizing transponder-enabled transactions, comprising:
a transaction server comprising a memory that stores an account table and is communicatively linked to a point of sale device, wherein the account table comprises financial account information relating to a financial account and the point of sale device is associated with a merchant;
a transponder, that is provided to a user and is configured for inclusion in or on a wearable personal article or the transponder is integrated with the wearable personal article and is provided to the user with the wearable personal article, that emits transponder identification information, linked to the financial account information, and that is capable of being received by a transponder information identification receiver that is coupled to the point of sale device, and the transponder identification information is emitted from the transponder upon presentation of the transponder with a transaction presented at the point of sale device;
wherein further the received transponder identification information is communicated to the point of sale device, and subsequently transmitted to the transaction server along with a payment amount for the transaction, the transmission occurring via the communications link, and the transaction server providing a validation for the transaction, allowing the transaction to be completed, based upon the validation;
wherein the transaction server and the account table are associated with an issuing bank and a transaction network; and
a registration server communicatively coupled with at least the account table and at least one client workstation;
wherein the registration server receives the financial account information and the transponder identification information from the client workstation, and links the financial account information and the transponder identification information in a database, and stores the linked information in the database for subsequent processing of transactions.

12. The system of claim 11, wherein the personal article comprises one of a key chain, watch, clothing, wireless communications devices, or key.

* * * * *